(12) United States Patent
Ootaka et al.

(10) Patent No.: US 10,195,676 B2
(45) Date of Patent: Feb. 5, 2019

(54) CUTTING INSERT, CUTTING TOOL, AND METHOD OF MANUFACTURING MACHINED PRODUCT

(71) Applicant: KYOCERA Corporation, Kyoto-shi, Kyoto (JP)

(72) Inventors: Tsuyoshi Ootaka, Satsumasendai (JP); Tomohiro Onitsuka, Satsumasendai (JP); Hiroshi Kawabuchi, Ganzhou (CN)

(73) Assignee: Kyocera Corporation, Kyoto (JP)

( * ) Notice: Subject to any disclaimer, the term of this patent is extended or adjusted under 35 U.S.C. 154(b) by 0 days.

(21) Appl. No.: 15/506,789

(22) PCT Filed: Aug. 27, 2015

(86) PCT No.: PCT/JP2015/074253
§ 371 (c)(1),
(2) Date: Feb. 27, 2017

(87) PCT Pub. No.: WO2016/031921
PCT Pub. Date: Mar. 3, 2016

(65) Prior Publication Data
US 2017/0252837 A1 Sep. 7, 2017

(30) Foreign Application Priority Data
Aug. 27, 2014 (JP) ................. 2014-172797

(51) Int. Cl.
*B23C 5/20* (2006.01)
*B23B 27/16* (2006.01)
*B23B 27/22* (2006.01)
*B23C 5/06* (2006.01)

(52) U.S. Cl.
CPC ................ *B23C 5/20* (2013.01); *B23B 27/16* (2013.01); *B23B 27/1607* (2013.01);
(Continued)

(58) Field of Classification Search
CPC .. B23C 5/20; B23C 5/06; B23C 5/109; B23C 2200/087; B23C 2228/10;
(Continued)

(56) References Cited

U.S. PATENT DOCUMENTS 4,966,501 A * 10/1990 Nomura ................ B23B 27/148
407/119
5,477,754 A 12/1995 Herbon
(Continued)

FOREIGN PATENT DOCUMENTS

EP 0298729 A1 * 1/1989 ........... B23B 27/148
WO WO 2007142224 A1 * 12/2007 ............... B23C 5/06

*Primary Examiner* — Ryan Rufo
(74) *Attorney, Agent, or Firm* — Volpe and Koenig, P.C.

(57) ABSTRACT

A cutting insert includes a base body and a coating layer, and also includes a rake surface, a flank surface, and a cutting edge located along an intersecting ridge therebetween. The rake surface includes an outer peripheral part and a middle part protruded relative to the outer peripheral part. The middle part includes a constraining surface. The outer peripheral part includes a first breaker part, a second breaker part, and the third breaker part adjacent to the constraining surface. The constraining surface is configured by the base body and the coating layer does not exist at the constraining surface. A skewness Rsk of a roughness curve at the constraining surface is −1.5 μm to −0.5 μm. A skewness Rsk at the third breaker part is −0.2 μm or less. The skewness Rsk at the constraining surface is smaller than the skewness Rsk at the third breaker part.

7 Claims, 11 Drawing Sheets

(52) U.S. Cl.
CPC .............. *B23B 27/22* (2013.01); *B23C 5/205* (2013.01); *B23B 2228/10* (2013.01); *B23C 5/06* (2013.01); *B23C 2200/0444* (2013.01); *B23C 2200/082* (2013.01); *B23C 2200/087* (2013.01); *B23C 2228/10* (2013.01)

(58) Field of Classification Search
CPC ... B23C 2200/368; B23B 27/16; B23B 27/22; Y10T 407/2284
See application file for complete search history.

(56) References Cited

U.S. PATENT DOCUMENTS

| | | | | |
|---|---|---|---|---|
| 6,161,990 | A * | 12/2000 | Oles | B23B 27/145 407/113 |
| 6,171,031 | B1 * | 1/2001 | LaFlamme | B23B 27/141 407/113 |
| 6,422,931 | B1 * | 7/2002 | Laflamme | B23C 5/202 451/231 |
| 7,687,156 | B2 * | 3/2010 | Fang | B22F 7/062 407/119 |
| 2002/0146292 | A1 * | 10/2002 | Shimizu | B23B 27/145 407/113 |
| 2007/0160869 | A1 * | 7/2007 | Jonsson | C23C 14/588 428/689 |
| 2007/0253787 | A1 * | 11/2007 | Ishii | B23B 27/141 407/113 |
| 2008/0260475 | A1 * | 10/2008 | Bodewig | B23C 5/207 407/42 |
| 2008/0260477 | A1 * | 10/2008 | Omori | B23B 27/141 407/119 |
| 2009/0245951 | A1 * | 10/2009 | Hayashizaki | B23C 5/2269 407/49 |

* cited by examiner

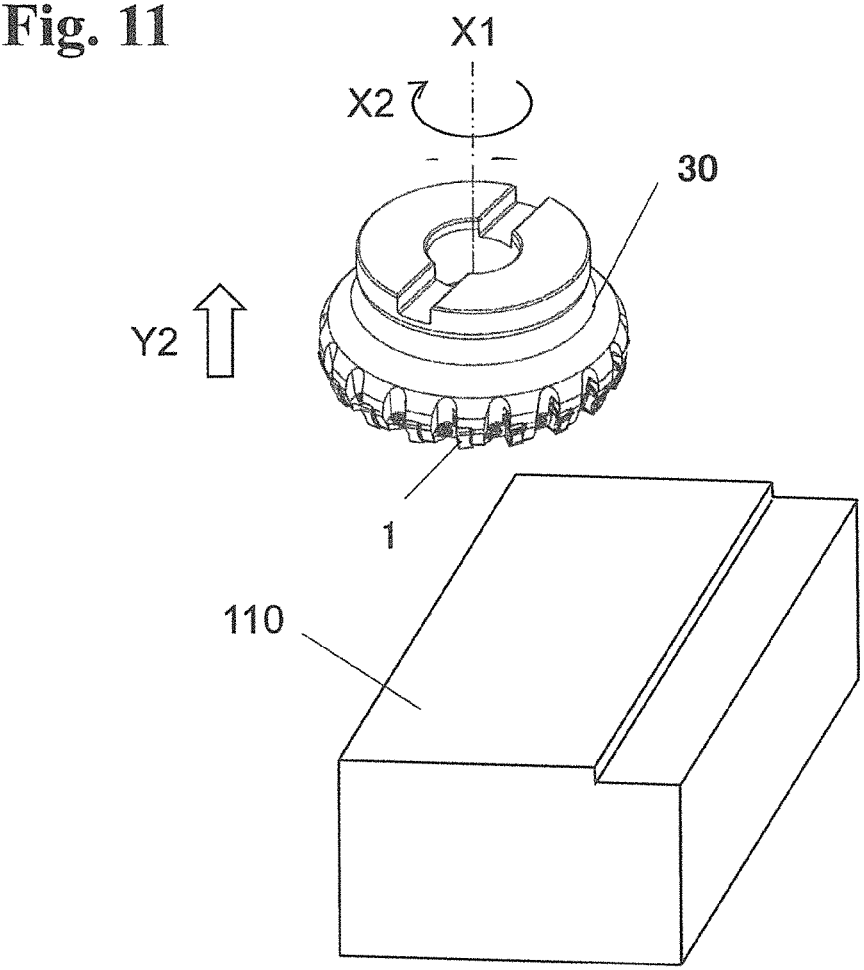

US 10,195,676 B2

CUTTING INSERT, CUTTING TOOL, AND METHOD OF MANUFACTURING MACHINED PRODUCT

TECHNICAL FIELD

The present invention relates to a cutting insert having a coating layer on a surface of a base body, a cutting tool, and a method of manufacturing a machined product.

BACKGROUND ART

As an embodiment of cutting tools, there is one which is used by attaching a cutting insert to a holder. Specifically, a seating surface of the insert is mounted on an insert pocket at a front end of the holder, and the insert is fixedly attached to the holder. For example, the insert has such a shape that a major surface thereof has an approximately polygonal tabular shape and a plurality of corner parts formed on one or both of the major surfaces are made into corner cutting edges. The cutting insert is used by attaching and reattaching the cutting insert to the holder so that these corner cutting edges are sequentially located at a tip side end of the holder.

As a known example of the material of the cutting insert, a coating layer is deposited on a surface of a base body composed of a hard alloy, such as cemented carbide and cermet. The coating layer is composed of a single layer of or a plurality of CVD layers which are deposited by CVD method, such as a titanium carbide layer, a titanium nitride layer, a titanium carbonitride layer, and an aluminum oxide layer.

A proposed method for a cutting insert includes depositing a coating layer on a surface of a base body, and thereafter polishing the surface of the coating layer located at a specific position. For example, Patent Document 1 discloses a cutting insert obtained by depositing a coating layer, followed by removing the coating layer deposited on a seating surface of the cutting insert by polishing.

PRIOR ART DOCUMENT

Patent Document

Patent Document 1: U.S. Pat. No. 5,477,754

SUMMARY OF THE INVENTION

Means for Solving the Problems

A cutting insert of the present embodiment includes a base body and a coating layer located on a surface of the base body. The cutting insert also includes a rake surface, a flank surface, and a cutting edge located along an intersecting ridge between the rake surface and the flank surface. The rake surface includes a constraining surface formed by causing a middle part of the rake surface to be protruded relative to an outer peripheral part of the rake surface, and a breaker adjacent to the cutting edge. The breaker includes a first breaker part close to the cutting edge, an intermediate second breaker part, and a third breaker part adjacent to the constraining surface. The constraining surface is configured to expose the base body under absence of the coating layer. A skewness Rsk of a roughness curve on a surface of the constraining surface is −1.50 μm to −0.50 μm. A skewness Rsk of a roughness curve at the third breaker part is −0.20 μm or less. The skewness Rsk on the surface of the constraining surface is smaller than the skewness Rsk at the third breaker part.

A cutting tool of the present embodiment includes the cutting insert and a holder having a mount surface configured to mount the cutting insert thereon.

A method of manufacturing a machined product of the present embodiment includes rotating at least one of the cutting tool and a workpiece, bringing a cutting edge of the cutting tool into contact with the workpiece, and separating the cutting tool from the workpiece.

BRIEF DESCRIPTION OF THE DRAWINGS

FIG. 7A is viewed along a direction X;

FIG. 11 is a schematic explanatory drawing that shows a step in the method of manufacturing the machined product according to the embodiment.

EMBODIMENTS FOR CARRYING OUT THE INVENTION

Figure 1:
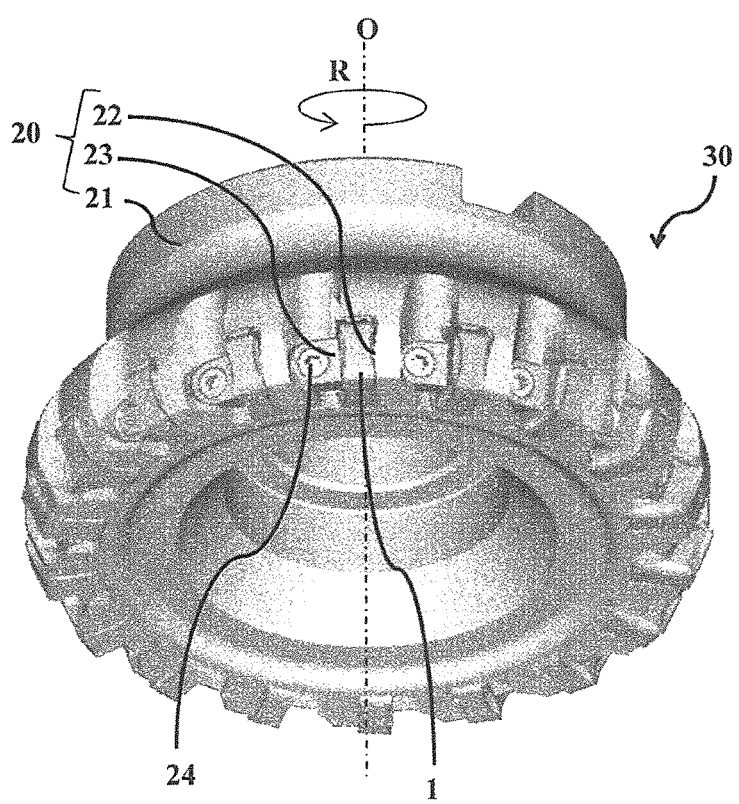
FIG. 1 is a schematic perspective view of a first embodiment of a cutting tool having a cutting insert according to a first embodiment attached thereto.
Figure 2:
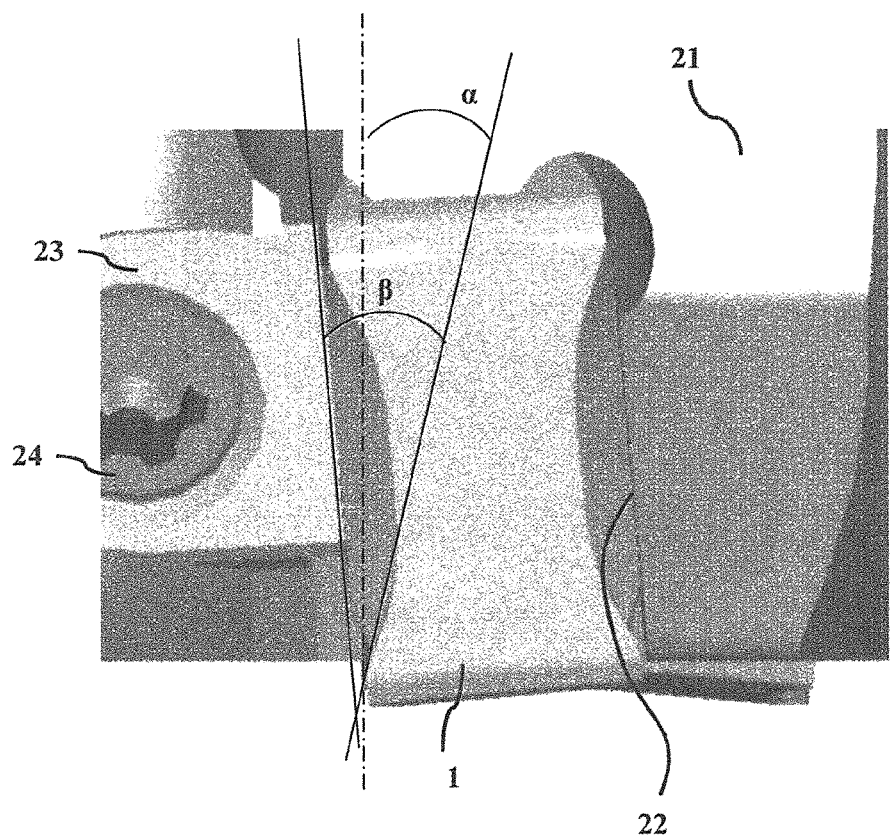
FIG. 2 is an enlarged diagram of a vicinity of the cutting insert in the cutting tool of FIG. 1.

In FIGS. 1 and 2 that show a first embodiment of a cutting tool including a cutting insert of the present embodiment attached thereto, the cutting tool 30 includes a holder 20 and the cutting insert (hereinafter referred to simply as "insert") 1 attached to the holder 20.

Figure 3:
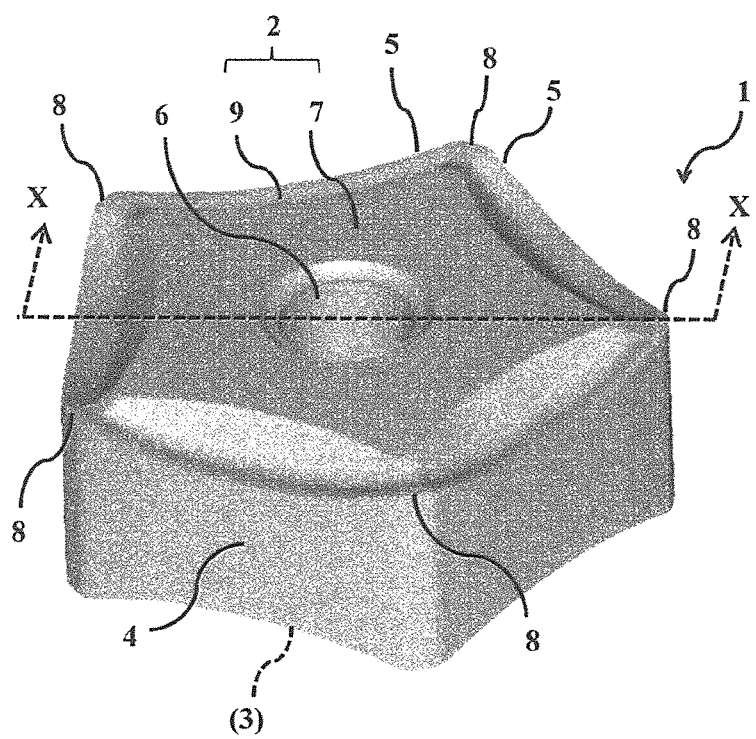
FIG. 3 is a schematic perspective view of the cutting insert to be attached to the cutting tool in FIGS. 1 and 2.
Figure 4:
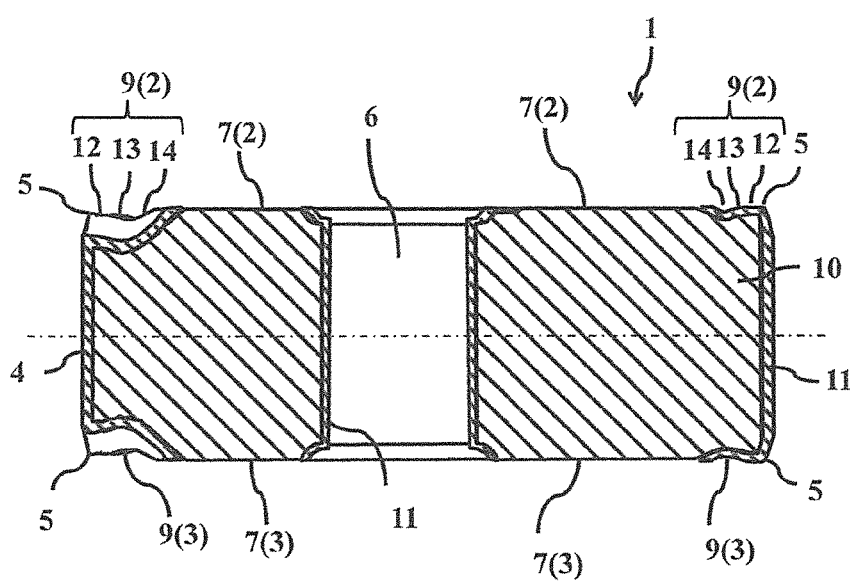
FIG. 4 is a sectional view taken along line X-X in the cutting insert of FIG. 3.

As shown in FIG. 3, the insert 1 includes a rake surface 2, a flank surface 4, and a cutting edge 5 located along an intersecting ridge between the rake surface 2 and the flank surface 4. More specifically, a major surface of the insert 1 has a polygonal shape and constitutes the rake surface 2, a side surface thereof constitutes the flank surface 4, and the intersecting ridge between the rake surface 2 and the flank surface 4 constitutes the cutting edge 5. A through hole 6 is located at a central part of the rake surface 2. A major surface of the insert 1 which is opposite to the rake surface 2 also serves as a rake surface 2 that also serves as a seating surface 3 when attaching to the holder 20. Although the seating surface 3 is not seen in FIG. 3, the position of the seating surface 3 is indicated by reference numeral thereof placed in parentheses. The insert 1 includes a constraining surface 7 whose height exceeds that of an outer peripheral part of the rake surface 2, in a middle part of the rake surface 2 except for the through hole 6, namely, around the through hole 6 of the rake surface 2. With reference to FIG. 3, both major surfaces of the insert 1 have a symmetrical shape, and both surfaces thereof are therefore usable in the following manner that the insert is turned over after performing cutting with the cutting edge 5 along the intersecting ridge while counterchanging corner parts 8 of one of the major surfaces, and then cutting is performable using the cutting edge 5 on the other major surface. The insert 1 has five corner parts 8 on one major surface, and corner parts 8 on both major surfaces. Therefore in the insert 1, the rake surface 2 and the seating surface 3 have a line-symmetric shape as shown in FIG. 4. The seating surface 3 also has the constraining surface 7 thereon.

The holder 20 includes a holder body 21, a mount surface 22 configured to mount the insert 1 thereon, and a pressing part 23 configured to press the insert 1 against the mount surface 22. In FIGS. 1 and 2, the seating surface 3 of the insert 1 is contacted with the mount surface 22 of the holder 20, and the rake surface 2 of the insert 1 is contacted with the pressing part 23 of the holder 20. The pressing part 23 is configured to shift toward the insert 1 by fastening a screw 24 to be screwed into the holder body 21 through the pressing part 23 into the holder body 21, and the insert 1 is fixed to the holder 20 by fastening the screw 24. Reversely, by unfastening the screw 24, the pressing part 23 is shifted in a direction away from the insert 1, and the insert 1 is separated from the holder 20.

The holder body 21 has a rotation axis O at the center thereof, and the holder 20 is rotated in an arrowed direction R in FIG. 1, namely, in a direction from the seating surface 3 toward the rake surface 2 in the insert 1 in FIG. 2. During this time, a cutting process of a workpiece (not shown) is carried out by a milling process of cutting the workpiece by using the cutting edge 5 of each of the inserts 1 being attached to the holder body 21.

With the present embodiment, the insert 1 is inclined with respect to the rotation axis O of the holder body 2 in a direction in which the rake surface 2 faces the workpiece as shown in FIG. 2. Setting is made so that a rake angle α in an axial direction of the rake surface 2 is 12-20°. This contributes to decreasing a cutting resistance of the insert 1, making it possible to increase the number of the inserts 1 to be mounted on the holder 20 within a range to prevent any excessive cutting resistance exerted on the holder 20. Consequently, the cutting tool 30 is capable of achieving highly efficient machining at a higher feed rate. A rake angle β of the rake surface 2 as a single body is 20-35°.

As shown in FIGS. 3 and 4, the insert 1 includes the constraining surface 7 and a breaker 9 on the rake surface 2. The middle part of the rake surface 2 is protruded relative to the outer peripheral part, and a top surface of a protruded part constitutes the constraining surface 7. The breaker 9 is located adjacent to the cutting edge 5 located along an outer peripheral end of the rake surface 2. The breaker 9 includes a first breaker part 12 close to the cutting edge 5, an intermediate second breaker part 13, and a third breaker part 15 adjacent to the constraining surface 7. In the present embodiment, when the rake surface 2 of the insert 1 is viewed and a length of the breaker 9 is divided into three equal parts, the part being close to the cutting edge 5 is defined as the first breaker part 12, the intermediate part is defined as the second breaker part 13, and the part being close to the constraining surface 7 is defined as the third breaker part 14. The first breaker part 12 is adjacent to the cutting edge 5 in the present embodiment.

As shown in FIG. 4, the insert 1 includes a base body 10 and a coating layer 11 located on a surface of the base body 10. In the present embodiment, the constraining surface 7 is configured to expose the base body 10 under absence of the coating layer 11. Here, the constraining surface 7 is defined as a region free from the coating layer 11, and the breaker 9 is defined as a region having the coating layer 11 thereon.

A skewness Rsk of a roughness curve (hereinafter also simply referred to as "Rsk") on a surface of the constraining surface 7 is −1.50 μm to −0.50 μm, and an Rsk at the third breaker part 14 in the breaker 9 is −1.20 μm or less. The Rsk on the surface of the constraining surface 7 is smaller than the Rsk at the third breaker part 14.

This ensures that cutting heat generated in the cutting edge 5 of the insert 1 is released from the surface of the constraining surface 7 of the insert 1 to the holder 20 through the mount surface or the pressing part 23 of the holder 20. The insert 1 therefore has high heat radiation performance. Additionally, a sharp protruding portion is reduced from the surface of the constraining surface 7. Therefore, when removing the insert 1 from the holder, there occurs no difficulty in removing the insert 1. Additionally, high chip discharge performance is obtainable and welding of chips is avoidable by holding cutting oil at the third breaker part 14. In the present embodiment, surface roughness, such as Rsk and a maximum height Rz, is measured according to JIS-B0601:2001.

In other words, by the presence of the coating layer 11 on the surface of the constraining surface 7, the coating layer 11 has lower thermal conductivity than the base body 10, thus leading to low heat radiation performance of the insert 1. When the Rsk on the surface of the constraining surface 7 is larger than −0.50 μm, a contact area between the constraining surface 7 and the holder 20 is decreased, thus leading to low heat radiation performance of the insert 1. When the Rsk on the surface of the constraining surface 7 is smaller than −1.50 μm, it may take an extremely long period of time to carry out polishing. This leads to considerably low producibility, thus being impractical. When the Rsk at the third breaker part 14 is larger than −0.20 μm, chips passing over the third breaker part 14 may be caught by a protruded portion on the surface of the third breaker part 14, the chips may be partly welded, thus being susceptible to wear. When the Rsk on the surface of the constraining surface 7 is equal to or larger than the Rsk at the third breaker part 14, in such a cutting manner that a cutting process is carried out while flowing a cutting oil, chip discharge performance may be deteriorated because of poor cutting oil retainability at the third breaker part 14. Specifically, when the Rsk on the surface of the constraining surface 7 is smaller than the Rsk at the third breaker part 14, the third breaker part 14 has the poor cutting oil retainability, and the constraining surface 7 is less effective in damming up the cutting oil flowing out of the third breaker part 14, thus further deteriorating the cutting oil retainability at the third breaker part 14.

On this occasion, the pressing part 23 of the holder 20 is brought into contact with the constraining surface 7 of the rake surface 2 of the insert 1 so as to press the cutting insert 1 against the mount surface 22. By contacting with an area of at least 50% or more of the constraining surface 7 of the rake surface 2, it is possible to enhance the heat radiation performance of the insert 1. The entire surface of the constraining surface 7 of the rake surface 2 is contacted with the pressing part 23 in the present embodiment. It is also possible to avoid the fact that when attaching the insert 1 to the holder 20, the constraining surface 7 of the insert 1 sinks into the pressing part 23 of the holder, and when removing the insert 1 from the holder 20, it is difficult to remove the insert 1. The mount surface 22 of the holder 20 is also preferably contacted with an area of at least 50% or more of the constraining surface 7 of the seating surface 3. The entire surface of the constraining surface 7 of the seating surface 3 is contacted with the mount surface 22 in the present embodiment.

In the present embodiment, a measurement of the Rsk at the third breaker part 14 is made by defining a boundary between the third breaker part 14 and the constraining surface 7 and a boundary between the third breaker part 14 and the second breaker part 13 in a plan view, and measuring the Rsk at a position having an intermediate height among heights of the third breaker part 14 obtained between these two boundaries. An Rsk at the first breaker part 12 close to the cutting edge 5 is −1.50 μm to −0.50 μm in the present embodiment. A measurement of the Rsk at the first breaker part 12 is made by defining a boundary between the first breaker part 12 and the cutting edge 5 and a boundary between the first breaker part 12 and the second breaker part 13 in a plan view, and measuring the Rsk at a position having an intermediate height among heights of the first breaker part 12 obtained between these two boundaries. The Rsk at the second breaker part 13 is −1.20 μm to 1.00 μm, and is larger than each of the Rsk at the third breaker part 14 and the Rsk at the first breaker part 12 in the present embodiment.

The Rsk at the second breaker 13 is measured at a position having a minimum height of the second breaker part 13. By making the Rsk at the second breaker part 13 larger than the Rsk at the first breaker part 12 and at the third breaker part 14, it is possible to more surely curve chips and inhibit the deterioration of chip discharge performance.

In the present embodiment, an Rz on the constraining surface 7 is 0.70 μm to 1.50 μm, preferably 0.80 μm to 1.30 μm. An Rz at the first breaker part 12 is 0.70 μm to 1.70 μm, preferably 0.80 μm to 1.50 μm. An Rz on the second breaker part 13 is 1.00 μm to 2.10 μm, preferably 1.20 μm to 2.00 μm. An Rz at the third breaker part 14 is 0.80 μm to 1.70 μm, preferably 0.90 μm to 1.60 μm. The heat radiation performance of the insert 1 is high and chip discharge performance is also satisfactory within these ranges.

The base body 10 of the insert 1 is composed of a hard alloy in which a hard phase is bonded with a binding metal, such as cemented carbide and cermet. For example, a cemented carbide composed mainly of WC has higher thermal conductivity than a cermet composed mainly of TiCN. When the thermal conductivity of the base body 10 is 60 W/m·K or more, the heat radiation performance of the insert 1 can be further improved. As a material suitable for the base body 10 whose thermal conductivity is 60 W/m·K or more, there are, for example, cemented carbide, diamond, cBN, and silicon nitride.

Figure 5:
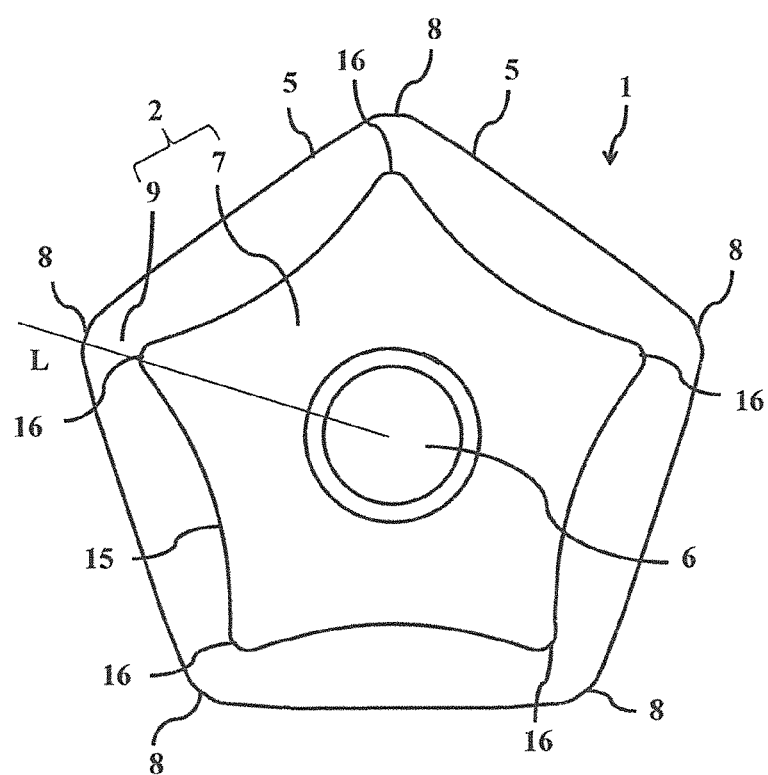
FIG. 5 is a plan view of the cutting insert of FIG. 3.

Here, in the case where, when the rake surface 2 is viewed, the rake surface 2 includes at least one corner part 8, and a boundary line 15 between the constraining surface 7 and the breaker 9 has a convex shape 16 protruding toward the corner part 8, the constraining surface 7 having high heat radiation performance is close to the corner part 8 at which cutting temperature reaches highest, thus leading to high heat radiation performance on the constraining surface 7. In the present embodiment, the rake surface 2 has five corner parts 8, and there are five convex shapes 16 protruding toward the corner part 8 as shown in FIG. 5. The shape of the breaker 9 has a line-symmetric shape with respect to a straight line L connecting the center of the insert 1 and the cutting edge 5. The boundary line 15 between the constraining surface 7 and the breaker 9, namely, the boundary line 15 between the constraining surface 7 and the third breaker part 14 protrudes most toward the cutting edge 5 at a position intersecting with the straight line L.

The coating layer 11 is composed of a compound having higher hardness than the base body 10. In the present embodiment, the coating layer 11 is composed of a CVD layer deposited by CVD method, in which, for example, a TiN layer, a TiCN layer, a TiCNO layer, an $Al_2O_3$ layer, and a TiN layer are sequentially laminated one upon another from the base body 10 side. On the rake surface 2 of the insert 1, the constraining surface 7 and the outer peripheral part, except for the constraining surface 7, differ in material to be exposed, and therefore, the color of the constraining surface 7 and the color of the outer peripheral part can be made different from each other. Alternatively, the coating layer 11 may be a PVD layer deposited by PVD method.

In the present embodiment, the constraining surface 7 has, on a surface thereof, wheel marks extending in a plurality of directions. When the wheel marks are oriented in one direction, a difference can occur in heat radiation performance depending on a difference in cutting edge position and in extending direction of the wheel marks, and variations can occur in cutting performance. It is, however, possible to inhibit the variations in cutting performance between the cutting edges because the wheel marks are not oriented in one direction in the present embodiment.

The present embodiment is not limited to the embodiment that the constraining surface 7 has, on the surface thereof, polishing marks extending in the directions. For example, when the surface of the rake surface 2 is subjected to a polishing process by a blast polishing process, a plurality of approximately circular polishing marks generated from collision of abrasive grains may exist on the surface of the constraining surface 7.

Figure 6:
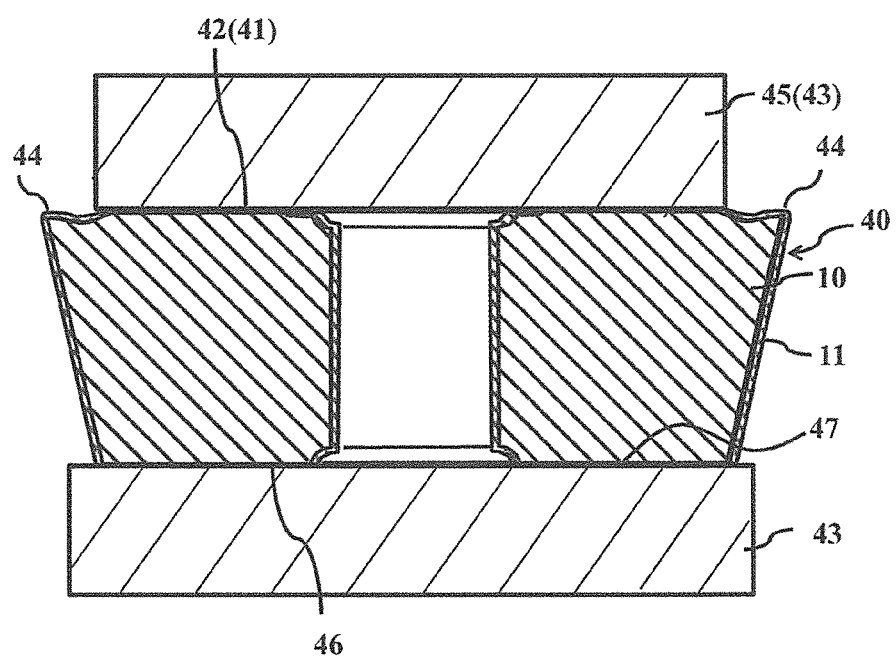
FIG. 6 is a schematic sectional view of a cutting tool having a cutting insert according to a second embodiment attached thereto.
Figure 7:
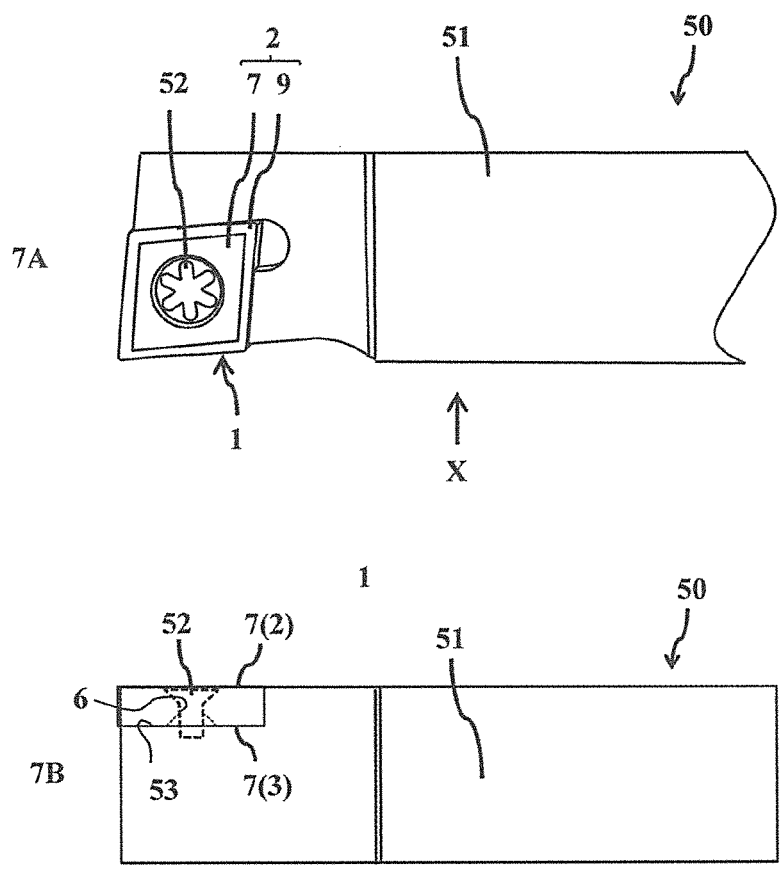
FIG. 7A is a schematic front view of a cutting tool having a cutting insert according to a third embodiment attached thereto.
FIG. 7B is a side view when

Although the first embodiment has described the insert 1 whose both major surfaces have the symmetric shape, so-called negative insert shape, which is to be turned over after using the cutting edge on one major surface, and the cutting edge on the other major surface is to be used thereafter, the present invention is not limited thereto. For example, when an insert 40 is configured so that a constraining surface 42 within a rake surface 41 is brought into contact with a pressing part 45 of a holder 43, as shown in a tool 40 in FIG. 6 that is a second embodiment, the insert 40 may have a so-called positive insert shape that has a cutting edge 44 only on one surface. In this case, a seating surface 46 is also constrained by a mount surface 47 of the holder 43. In the insert 1 of the negative insert shape, for example, as shown in FIGS. 7A and 7B that show a third embodiment, a cutting tool 50 may be configured so that a screw 52 is passed through the through hole 6 from the rake surface 2 side, and the screw 52 presses against an inner wall surface of the through hole 6 so as to fix the insert 1 to a mount surface 53 of the holder 51, instead of such an embodiment that the constraining surface 7 within the rake surface 2 of the insert 1 is brought into contact with a holder 51. In this case, the constraining surface 7 within the rake surface 2 of the insert 1 is constrained by the mount surface 53 of the holder 51 when the insert 1 is used by being turned over, namely, by using the rake surface 2 as the seating surface 3. Further-more, the insert of the present embodiment is applicable to both of inserts for the turning process and inserts for the milling process.

A method of manufacturing the cutting insert according to the present embodiment is described below by referring to an example of a method of manufacturing the insert 1.

Firstly, metal powder, carbon powder, or the like are suitably added to inorganic powder, such as metal carbide, nitride, carbonitride, and oxide, with which a hard alloy constituting the base body 10 can be formed by sintering, and these are mixed together. This mixture is then molded into a predetermined tool shape by a well-known molding method, such as press molding, cast molding, extrusion molding, cold isostatic pressing, followed by sintering in vacuum or in a non-oxidizing atmosphere, thereby manufacturing the base body 10 composed of the hard alloy. The base body 10 is made into such a shape that the constraining surface 7 is protruded in a thickness direction relative to the outer peripheral part having the cutting edge 5 and the breaker part 9 located thereon. Thereafter, a surface of the base body 10 is subjected to a polishing process and a cutting edge part is subjected to a honing process as desired.

Subsequently, the coating layer 11 is deposited on the surface of the base body 10 by, for example, chemical vapor deposition (CVD) method. Specifically, hydrogen gas ($H_2$) gas is used a carrier gas. Reaction gases, such as titanium tetrachloride ($TiCl_4$) gas, methane ($CH_4$) gas, acetonitrile ($CH_3CN$) gas, aluminum trichloride ($AlCl_3$) gas, nitrogen ($N_2$) gas, and hydrogen chloride (HCl) gas, are mixed together in a predetermined proportion into the carrier gas to obtain a mixed gas. Deposition is carried out by introducing the mixed gas into a chamber of a CVD reaction apparatus at a deposition temperature of 800-1100° C. and a gas pressure of 5-50 kPa.

Thereafter, the surface of the deposited coating layer 11 is subjected to a grinding process. Firstly, the coating layer 11 deposited on the constraining surface 7 is removed by using a surface grinding machine. The grinding process is carried out so that regions other than the constraining surface 7 are not ground. By processing the constraining surface 7 with the surface grinding machine, the base body 10 is exposed to the surface of the constraining surface 7, and the grinding marks oriented in one direction are formed thereon. The grinding process is carried out using a diamond grinding wheel of #220 to #1500.

Subsequently, the entirety of the rake surface 2 is subjected to a polishing process. Brush polishing or blast polishing is applicable as a polishing process method. For example, specific conditions for a brush polishing process are as follows. A paste is manufactured by mixing diamond abrasive grains having a mean particle diameter of 0.5-3 μm and a lubricating oil at a mixing ratio (diamond abrasive grains/lubricating oil) of 10-50% by volume. The paste is applied to the surface of the rake surface, followed by polishing with a brush for 3-6 minutes. In the present embodiment, the rake surface is preferably polished into a mirror surface. The lubricating oil is preferably a viscous material, such as olive oil.

Thus, the entirety of the rake surface 2 including the constraining surface 7, the breaker 9, and the cutting edge 5 is polished, thereby making it possible to bring a surface condition into a predetermined range.

In the case of a blast polishing process, a propellant containing abrasive grains having predetermined hardness is sprayed toward the rake surface of the insert. By adjusting an angle of a spray nozzle configured to spray the propellant therethrough, and a distance therefrom to the rake surface, it is possible to polish the entirety of the rake surface 2 including the constraining surface 7, the breaker 9, and the cutting edge 5, thereby bringing the surface condition into the predetermined range.

<Method of Manufacturing Machined Product>

A method of manufacturing a machined product according to an embodiment is described below in detail with reference to FIGS. 9 to 11, taking as an example the case of using the cutting tool 30 as described above.

The method of manufacturing a machined product according to the present embodiment includes the following steps of (1) to (3).

(1) This step is to rotate at least one of the cutting tool 30 and a workpiece 101.

(2) This step is to bring the cutting edge 5 of the insert 1 of the cutting tool 30 into contact with the workpiece 101.

(3) This step is to separate the cutting tool 30 from the workpiece 101.

Figure 9:
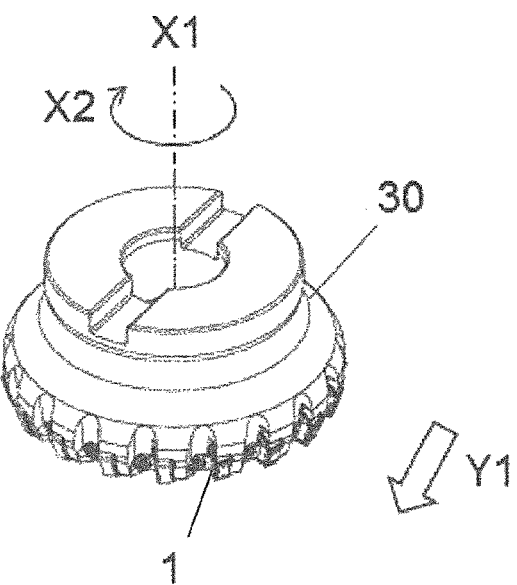
FIG. 9 is a schematic explanatory drawing that shows a step in a method of manufacturing a machined product according to an embodiment.
Figure 9:
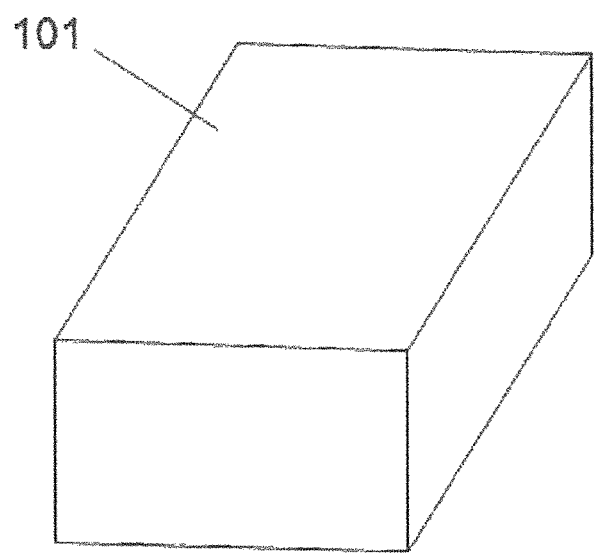

More specifically, with the present embodiment, firstly, the cutting tool 30 is relatively brought near the workpiece 101 by rotating the cutting tool 30 around a rotation axis X1 in a rotation direction X2, while moving the cutting tool 30 in direction Y1, as shown in FIG. 9. Examples of the workpiece 101 include aluminum, carbon steel, alloy steel, stainless steel, cast iron, and non-ferrous metals.

Figure 10:
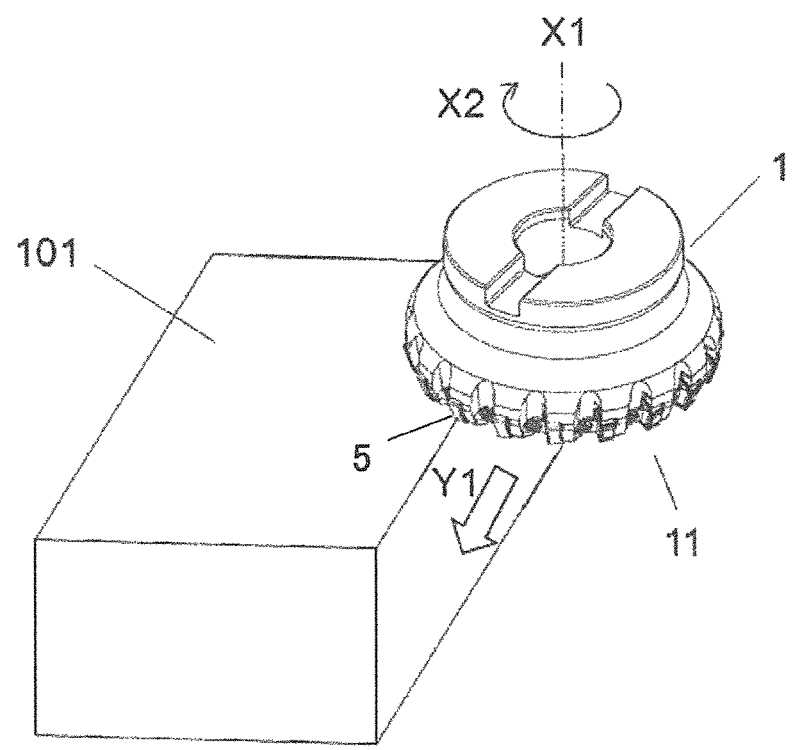
FIG. 10 is a schematic explanatory drawing that shows a step in the method of manufacturing the machined product according to the embodiment.

Subsequently, as shown in FIG. 10, the workpiece 101 is cut by bringing the cutting edge 5 of the cutting tool 30 into contact with the workpiece 101, while moving the cutting tool 30 in the direction Y1. In the present embodiment, the cutting edge 5 is capable of cutting the workpiece 101 because of using the cutting tool 30.

Finally, as shown in FIG. 11, the cutting tool 30 is relatively separated from the workpiece 101 by moving the cutting tool 30 in direction Y2, thereby obtaining a desired machined product 110.

The machined product 110 is obtainable by moving the cutting tool 30 in the present embodiment without being limited thereto. That is, in the step (1), the workpiece 101 may be rotated, or the workpiece 101 may be brought near the cutting tool 30, as in the case of being used as a turning tool. Likewise, in the step (3), the workpiece 101 may be separated from the cutting tool 30. When the cutting process is continued, it is necessary to repeat the step of bringing the cutting edge 5 into contact with different portions of the workpiece 101, while the cutting tool 30 is kept rotating.

Although the several embodiments according to the present invention have been described above, the present invention is not limited to the foregoing embodiments. It is of course understood that it is possible, without departing from the scope of the invention, to make modifications into any optional one.

For example, the cutting tool 30 is the milling tool in the foregoing embodiment. Similar effects are obtainable by using the cutting tool 50 that is the turning tool, instead of the cutting tool 30.

Example 1

Firstly, 6% by mass of metal cobalt powder having a mean particle diameter of 1.2 μm, 0.5% by mass of titanium carbide powder having a mean particle diameter of 2.0 μm, 5% by mass of niobium carbide powder, and the rest that was tungsten carbide powder having a mean particle diameter of 1.5 μm were added and mixed together, followed by press molding into a tool shape (Cutting insert PNMG1106, except for PNEG1106 in Sample No. 11, manufactured by KYOCERA Corporation). This was then subjected to a debinding process and sintered at 1500° C. in vacuum of 0.01 Pa for one hour, thereby manufacturing a base body composed of cemented carbide having thermal conductivity of 92 W/m·K. Thereafter, the manufactured base body was subjected to a brush process, and a region serving as a cutting edge was subjected to round honing.

Figure 8A:
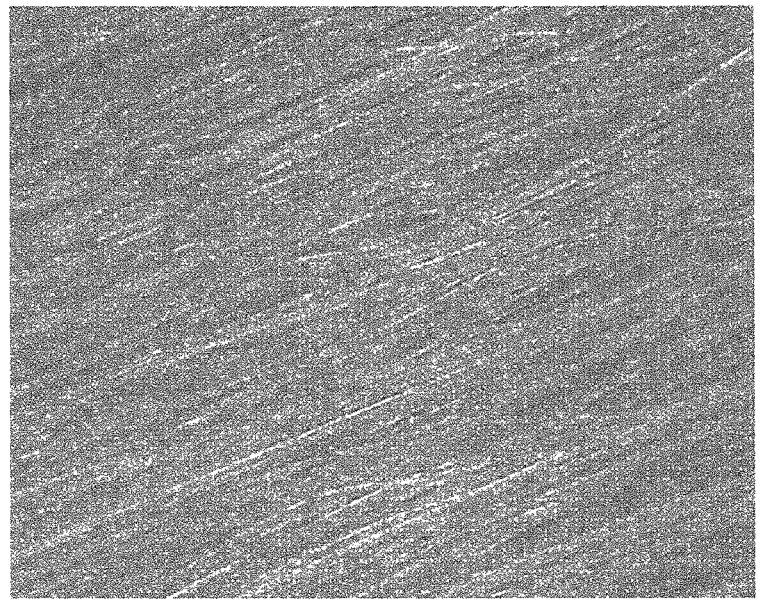
FIG. 8A is a microscope photograph that shows a base body being exposed on a constraining surface of the cutting insert of FIGS. 1 and 2.
Figure 8B:
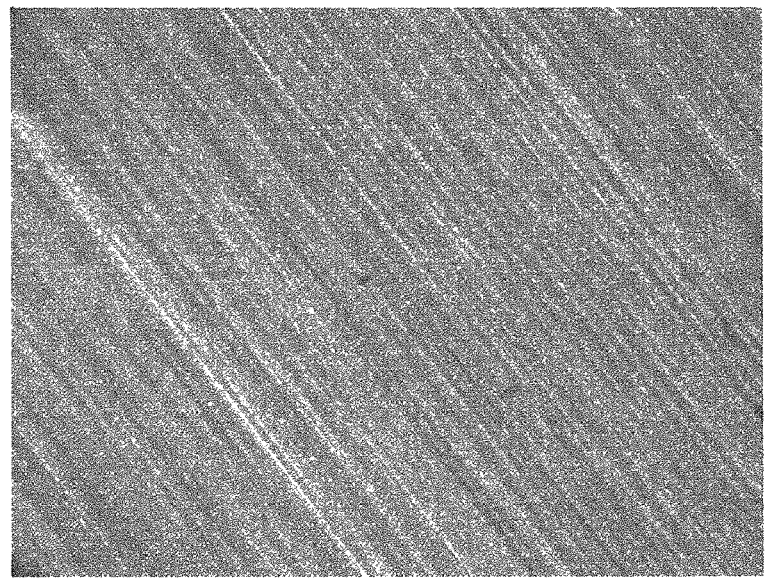
FIG. 8B is a microscope photograph that shows the base body being exposed to the constraining surface after subjected only to a grinding process without being subjected to a polishing process.

Subsequently, a coating layer having a total thickness of 10 μm made up of five layers of a TiN layer, a TiCN layer, a TiCNO layer, an $Al_2O_3$ layer, and a TiN layer was deposited by chemical vapor deposition (CVD) method on the base body composed of the cemented carbide. In Samples Nos. 1 to 9, by subjecting both major surfaces of the base body having the coating layer deposited thereon to a grinding process using a grinding wheel of #600 by using a surface grinding machine, and the coating layer on the constraining surface was removed to expose the base body. Polishing marks as shown in FIG. 8B were formed on the surface of the constraining surface. Thereafter, the surface of the rake surface was subjected to a brush polishing process under conditions presented in Table 1, thereby manufacturing inserts. A paste obtained by mixing diamond abrasive grains having a mean particle diameter of 4 μm and olive oil was used during the brush polishing process. The polishing marks on the surface of the constraining surface extended in a plurality of directions as shown in FIG. 8A. FIG. 8A is a microscope photograph of the polishing marks in Sample No. 4.

The surface roughness (skewness Rsk of a roughness curve and maximum height Rz) on the constraining surface, third breaker part, second breaker part, and first breaker part in the obtained inserts were measured. The results were presented in Table 1. A boundary between the constraining surface and the breaker was checked. One in which a boundary line protruding toward the corner part had a convex shape was indicated as "convex," and one in which the boundary line had a straight line form was indicated as "flat" in Table 2.

A cutting test of the inserts was conducted under the following conditions, and heat radiation performance and wear resistance were evaluated. The results were presented in Table 2.

(Evaluation Conditions for Heat Radiation Performance)
Workpiece: Chromium molybdenum steel (SCM435) φ80 mm×L175 mm
Cutting speed: 250 m/min
Feed rate: 0.3 mm/edge
Axial Cutting Depth "ap": 1.5 mm
Radial Cutting Depth "ae": 100 mm
Others: Dry cutting
Evaluated item: Cutting edge temperature was measured with a radiation thermometer when a workpiece was cut to L105 mm.

(Evaluation Conditions for Wear Resistance)
Workpiece: Chromium molybdenum steel (SCM435) φ200 mm×L250 mm
Cutting speed: 250 m/min
Feed rate: 0.3 mm/edge
Axial Cutting Depth "ap": 1.5 mm
Radial Cutting Depth "ae": 100 mm
Cutting time: 25 minutes
Others: Using water-soluble cutting fluid
Evaluated item: Wear volume of the flank surface was measured after processing for 30 minutes.

TABLE 1

| | Process condition | | | Surface roughness | | | | | | | |
|---|---|---|---|---|---|---|---|---|---|---|---|
| | | Brush polishing process | | Constraining surface | | First breaker part | | Second breaker part | | Third breaker part | |
| | | Mixing | Polishing | | | | | | | | |
| Sample No. | Grinding process | ratio (% by mass) | time (minutes) | Rsk (μm) | Rz (μm) | Rsk (μm) | Rz (μm) | Rsk (μm) | Rz (μm) | Rsk (μm) | Rz (μm) |
| 1 | Yes | 10 | 3 | −0.52 | 1.45 | −0.21 | 1.63 | −0.13 | 2.03 | −0.23 | 1.61 |
| 2 | Yes | 50 | 6 | −1.49 | 0.79 | −1.29 | 0.77 | −1.04 | 1.16 | −1.41 | 0.89 |
| 3 | Yes | 37 | 5 | −1.16 | 1.03 | −1.11 | 1.15 | −0.78 | 1.54 | −1.01 | 1.24 |
| 4 | Yes | 22 | 4 | −0.71 | 1.21 | −0.59 | 1.3 | −0.36 | 1.73 | −0.63 | 1.31 |
| 5 | Yes | 5 | 3 | −0.48 | 1.71 | −0.18 | 1.85 | −0.01 | 2.17 | −0.17 | 1.84 |
| 6 | Yes | 54 | 5 | −1.35 | 0.75 | −1.61 | 0.85 | −0.96 | 1.01 | −1.35 | 0.88 |
| 7 | Yes | 15 | 2 | −0.43 | 1.65 | −0.09 | 1.82 | −0.02 | 2.32 | −0.08 | 1.77 |
| 8 | Yes | 25 | 10 | −1.61 | 0.67 | −1.74 | 0.52 | −1.11 | 0.83 | −1.84 | 0.66 |
| 9 | Yes | — | — | 0.05 | 1.51 | 0.02 | 1.84 | 0.22 | 3.11 | 0.12 | 1.81 |
| 10 | No | 30 | 4 | −0.38* | 1.20* | −0.56 | 1.27 | −0.35 | 1.72 | −0.52 | 1.35 |
| 11 | Yes | 37 | 5 | −1.13 | 1.05 | −1.11 | 1.15 | −0.78 | 1.54 | −0.98 | 1.26 |

*stands for Rsk, Rz of the surface of the coating layer.

TABLE 2

| | | Cutting evaluation | |
|---|---|---|---|
| Sample No. | Shape of boundary line[1] | Cutting edge temperature (° C.) | Wear volume of flank surface (mm) |
| 1 | Convex | 550 | 0.25 |
| 2 | Convex | 515 | 0.27 |
| 3 | Convex | 529 | 0.21 |
| 4 | Convex | 533 | 0.19 |
| 5 | Convex | 565 | 0.35 |
| 6 | Convex | 526 | 0.41 |
| 7 | Convex | 570 | 0.44 |
| 8 | Convex | 510 | 0.38 |
| 9 | Flat | 580 | 0.47 |
| 10 | None | 599 | 0.38 |
| 11 | Flat | 552 | 0.24 |

The results in Tables 1 and 2 show the following. In Sample No. 10, the surface of the constraining surface was composed of the coating layer, the Rsk of the constraining surface was larger than −0.50 μm, the heat radiation performance of the insert was deteriorated, and the wear resistance thereof was deteriorated. In Samples Nos. 5, 7, and 9, the Rsk of the constraining surface was larger than −0.50 μm, the heat radiation performance of the insert was deteriorated, and the wear resistance thereof was deteriorated. In Sample No. 6, the Rsk of the constraining surface was the same as the Rsk of the third breaker part. In Sample No. 8, the Rsk of the constraining surface was smaller than −1.50 µm, and the Rsk of the constraining surface was larger than the Rsk of the third breaker part. Therefore, the ingredients of the workpiece were apt to be welded on the third breaker part of the inserts, and wear was apt to proceed.

In contrast, in Samples Nos. 1 to 4, and 11 according to the present embodiment, the inserts had high heat radiation performance, the ingredients of the workpiece were less apt to be welded on the third breaker part, and wear progressed slowly. Particularly, in Samples Nos. 1 to 4 in which the boundary line between the constraining surface and the breaker had the convex shape protruding toward the corner part, cutting temperature was low in the heat radiation performance evaluation than that of Sample No. 11.

Example 2

A base body composed of Cermet TN100M (thermal conductivity of 17 W/m·K) manufactured by KYOCERA Corporation was subjected to a brush process, and a region serving as a cutting edge was subjected to round honing. Thereafter, the same coating layer as that in Example 1 was deposited thereon. In Sample No. 12, by subjecting both major surfaces of the base body having the coating layer deposited thereon to a grinding process using a grinding wheel of #600 on a surface grinding machine, the coating layer on the constraining surface was removed to expose the base body. In Sample No. 13, no grinding process was carried out on both major surfaces of the base body having the coating layer deposited thereon. Thereafter, the surface of the rake surface was subjected to a brush polishing process, thereby manufacturing inserts. Similarly to Example 1, polishing marks were formed on the surface of the constraining surface in Sample No. 12.

The surface roughness were measured in the same manner as in Example 1. In Sample No. 12, the constraining surface had Rsk=−0.58 µm and Rz=1.67 µm, the third breaker part had Rsk=−0.11 µm and Rz=1.74 µm, the second breaker part had Rsk=0.12 µm and Rz=2.45 µm, and the first breaker part had Rsk=0.34 µm and Rz=2.86 µm. In Sample No. 13, the constraining surface had Rsk=−0.23 µm and Rz=1.89 µm, the third breaker part had Rsk=−0.31 µm and Rz=2.04 µm, the second breaker part had Rsk=0.15 µm and Rz=2.49 µm, and the first breaker part had Rsk=0.34 µm and Rz=2.86 µm.

The cutting test of the inserts was conducted under the same conditions as in Example 1, and the wear resistance of the inserts was evaluated. The abrasion width of the flank surface of Sample No. 12 was 0.30 mm, and the abrasion width of the flank surface of Sample No. 13 was 0.35 mm.

DESCRIPTION OF THE REFERENCE NUMERAL 1 cutting insert (insert)
2 rake surface
3 seating surface
4 flank surface
5 cutting edge
6 through hole
7 constraining surface
9 breaker
10 base body
11 coating layer
12 first breaker part
13 second breaker part
14 third breaker part
20 holder
30 cutting tool

The invention claimed is:

1. A cutting insert, comprising:
   a base body; and
   a coating layer located on a surface of the base body,
   wherein the cutting insert comprises a rake surface, a flank surface, and a cutting edge located along an intersecting ridge between the rake surface and the flank surface,
   the rake surface comprises an outer peripheral part adjacent to the cutting edge and a middle part protruded relative to the outer peripheral part,
   the middle part comprises a contacting surface,
   the outer peripheral part comprises a first breaker part close to the cutting edge, a third breaker part adjacent to the contacting surface and a second part located between the first breaker part and the third breaker part,
   the coating layer doesn't exist at the contacting surface,
   a skewness (Rsk) of a roughness curve at the contacting surface is −1.5 µm to −0.5 µm, a skewness (Rsk) of a roughness curve at the third breaker part is −0.2 µm or less, and
   the skewness (Rsk) of a roughness curve at the contacting surface is smaller than the skewness (Rsk) of a roughness curve at the third breaker part.

2. The cutting insert according to claim 1, wherein thermal conductivity of the base body is 60 W/m·K or more.

3. The cutting insert according to claim 1, wherein the surface of the contacting surface comprises wheel marks extending in a plurality of directions.

4. The cutting insert according to claim 1, wherein the rake surface comprises at least one corner part, and a boundary line between the contacting surface and the third breaker part has a convex shape protruding toward the corner part.

5. A cutting tool, comprising:
   a cutting insert according to claim 1; and
   a holder comprising a mount surface configured to mount the cutting insert thereon.

6. The cutting tool according to claim 5, wherein the holder comprises a pressing part configured to press the cutting insert against the mount surface by being brought into contact with the contacting surface of the cutting insert, and the pressing part is being contacted with an area of at least 50% or more of the contacting surface.

7. A method of manufacturing a machined product, comprising:
   rotating at least one of the cutting tool according to claim 5 and a workpiece;
   bringing the cutting edge of the cutting insert of the cutting tool that is brought into contact with the workpiece; and
   separating the cutting tool from the workpiece.

* * * * *